United States Patent [19]

Eustace et al.

[11] 3,997,362

[45] Dec. 14, 1976

[54] POLYHALIDE HIGH ENERGY DENSITY CELLS

[75] Inventors: Daniel J. Eustace, Chatham; Bhaskara M. L. Rao, Fanwood, both of N.J.

[73] Assignee: Exxon Research and Engineering Company, Linden, N.J.

[22] Filed: Oct. 14, 1975

[21] Appl. No.: 621,761

[52] U.S. Cl. .................................. 429/194; 429/218
[51] Int. Cl.² ........................................ H01M 35/02
[58] Field of Search ......... 136/6 F, 6 LN, 20, 83 R, 136/100 R, 137, 155

[56] References Cited
UNITED STATES PATENTS

| | | | |
|---|---|---|---|
| 3,057,760 | 10/1962 | Dereska et al. ................... | 136/137 |
| 3,562,017 | 2/1971 | Lyall .............................. | 136/137 X |
| 3,764,385 | 10/1973 | Langer, Jr. ...................... | 136/137 X |
| 3,816,177 | 6/1974 | Walsh ............................ | 136/137 X |

*Primary Examiner*—Anthony Skapars
*Attorney, Agent, or Firm*—M. A. Ciomek; J. J. Dvorak

[57] ABSTRACT

An improved electrochemical cell comprises an alkali metal anode, a cathode, an oxidant of at least one quaternary ammonium polyhalide salt, and a dipolar aprotic electrolyte containing an ionizable salt of an alkali metal. A specific example includes a lithium anode, a carbon cathode, a tetraalkylammonium tribromide salt and an electrolyte of one mole lithium hexafluoride dissolved in propylene carbonate, which cell provides an open circuit voltage of about 3.6 volts. The oxidant can be incorporated in the cathode structure or be added independently to the cell, e.g., by use of a circulating electrolyte.

9 Claims, 2 Drawing Figures

3,997,362

POLYHALIDE HIGH ENERGY DENSITY CELLS

BACKGROUND OF THE INVENTION

The present invention relates to electrochemical cells and more particularly to alkali metal halogen electrochemical cells.

Alkali metal-halogen electrochemical cells are highly desirable as energy sources because the electrochemical potentials between the alkali metals and the halogens are very large and these materials are comparatively light-weight. The combination of high electrochemical potentials and light weight maximizes the energy density levels.

Although halogen-alkali metal couples theoretically offer high energy density cells, problems associated with the containment of the halogens have prevented the realization of the theoretical values. The mobility of the halogens in the electrolyte results in self-discharge which lowers shelf life and reduces the realizable energy density of the cell.

BRIEF SUMMARY OF THE INVENTION

Generally speaking, the present invention relates to an improved electrochemical cell. The improved cell includes an alkali metal-containing anode, a cathode, a dipolar aprotic electrolyte containing at least one ionizable salt of an alkali metal, and an oxidant of at least one quaternary ammonium polyhalide salt.

DETAILED DESCRIPTION OF THE INVENTION

Figure 1:
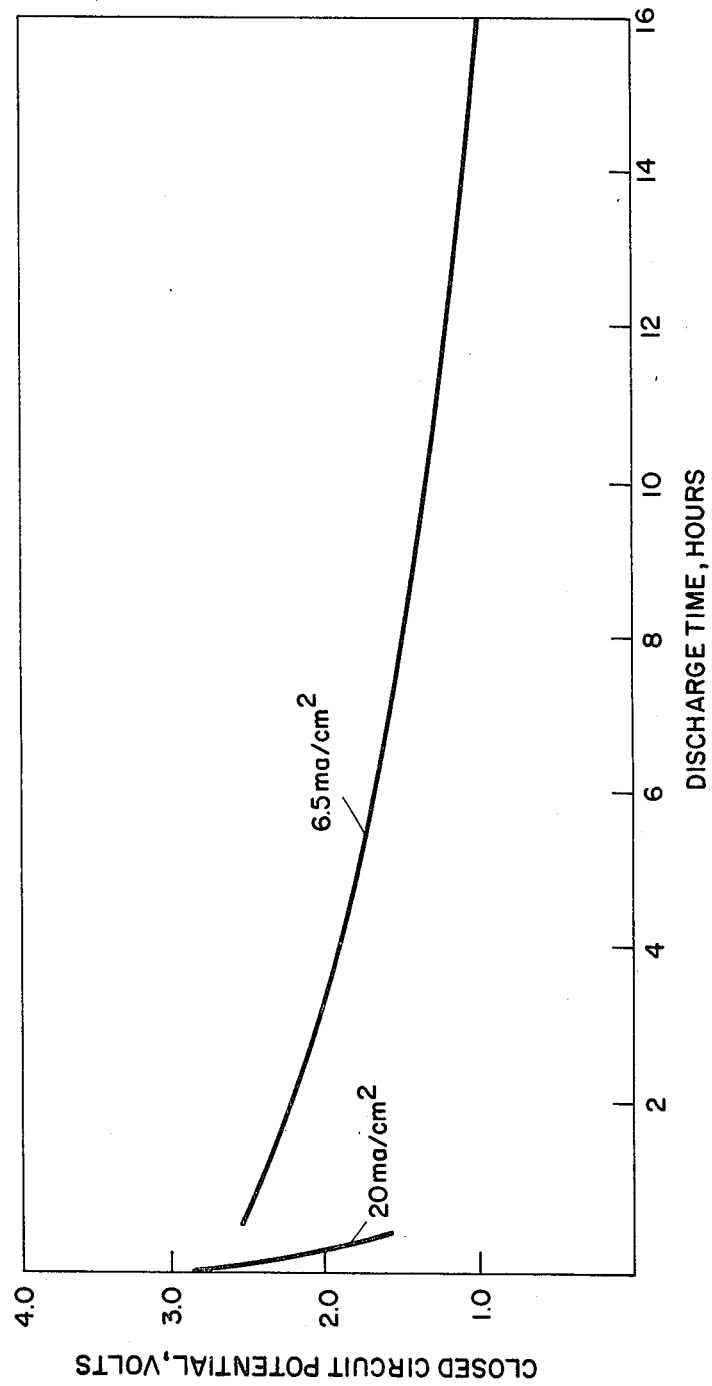
FIG. 1 is a graph of the discharge characteristics of cells in accordance with the present invention when discharging at two different current densities.

The present invention is directed to an improved electrochemical device which includes an anode containing as the anode-active material at least one alkali metal selected from the group consisting of lithium, sodium, potassium, cesium and rubidium, a cathode, an oxidant of at least one quaternary ammonium polyhalide in which the substituents of the ammonium compound can be alkyl, aryl or combinations thereof and the polyhalide is at least one halogen selected from the group consisting of chlorine, bromine and iodine and an electrolyte of a dipolar aprotic solvent having dissolved therein an ionizable salt of at least one alkali metal, advantageously the same alkali metal as that of the anode.

The term "anode" as used herein refers to the electrochemical active material contained in the negative electrodes of electrochemical devices. The term "cathode" as used herein is an electronic conductor which functions as the positive electrode and can be either electrochemically inactive or can have the oxidant incorporated in its structure. The use of the terms anode and cathode, however, does not exclude the presence of other structural members that lend structural stability to the electrodes and/or act as current collectors. The anode, for example, can include a lithium aluminum structure. The cathode, for example, can be constructed of electrically conductive porous carbon which may or may not be impregnated with the oxidant. Alternatively, if the oxidant, as described hereinafter, displays significant solubility in the electrolyte, the oxidant can be dissolved in a dipolar aprotic solvent and fed to the cell as such or through a porous electrode that functions as the cathode.

The anode-active material is at least one alkali metal selected from the group consisting of lithium, sodium, potassium, cesium and rubidium. Lithium is the preferred anode material because of its light weight and the high half cell potential it affords; and when used with a halogen half cell, the combination provides very high energy densities. The alkali metal can be used in the metallic state or as an alloy or amalgam, but alloying or amalgamation can lower the electrochemical potential (i.e. lower the half cell potential) and increase the overall weight thereby lowering the energy density of the cell.

The oxidant, which is the positive half cell, is at least one quaternary ammonium polyhalide salt, advantageously the salt is sparingly soluble in the electrolyte (e.g. less than about 0.05 mole per liter). The ammonium substituents can be alkyl, aryl or combinations thereof. The polyhalide can be homogeneous or heterogeneous with the halogen being at least one member selected from the group consisting of chlorine, bromine and iodine. Although the fluorine half cell potential when used in conjunction with the alkali metal half cell would provide exceedingly high electrochemical potentials thereby increasing the energy density levels of such cells, the reactivity and toxicity of fluorine militates against its use. This is particularly so since fluorine can polymerize a number of dipolar aprotic solvents, rendering them ineffective. Examples of the quaternary ammonium polyhalides that can be used as cathode-active materials in the present invention include tetramethylammonium trichloride, tetramethylammonium tribromide, tetramethylammonium chlorodibromide, tetramethylammonium iododibromide, tetraethylammonium trichloride, tetraethylammonium tribromide, and tetraethylammonium chlorodibromide. The most advantageous quaternary ammonium polyhalides are tetramethylammonium tribromide and tetramethylammonium chlorodibromide. These quaternary ammonium polyhalides are preferred for three reasons: (1) the smaller cation size reduces the solubility of the polyhalide salt in the dipolar aprotic medium; (2) the salts containing $Br_2^-\cdot Br_3^-$, $Br_2Cl^-$ are more stable than similar chlorine containing salts; and (3) the salts containing iodine produce a lower cell potential.

Electrolytes that can be used with the improved cells in accordance with the present invention include ionizable salts of at least one alkali metal selected from the group consisting of lithium, sodium, potassium, cesium and rubidium dissolved in a dipolar aprotic solvent. Examples of such ionizable salts include lithium hexafluorophosphate, lithium perchlorate, lithium tetrachloroaluminate, lithium hexafluoroarsenate, lithium hexachloroantimonate, lithium thiocyanide, lithium tetrafluoroborate, and lithium tetraphenylborate. The ionizable salt should be present in an amount sufficient to provide adequate ionic conductivity in the electrolyte. For example, when employing lithium hexafluorophosphate in propylene carbonate, the lithium salt should be present in an amount between about 0.1 and 0.8 moles per liter of propylene carbonate. Dipolar aprotic solvents that can be used include propylene carbonate, nitrobenzene and sulfolane.

In operation, upon completing the electrical circuit between the anode and cathode, the alkali metal is oxidized at the anode-electrolyte interface releasing electrons which flow through the external electric circuit and ions of the alkali metal which dissolve in the electrolyte. Electrons from the anode after passing through the external electric circuit flow through the cathode and ultimately reduce the polyhalide releasing halogen in a more active form to the electrolyte. The decomposition of dissolved polyhalides by reduction momentarily lowers the polyhalide concentration in the electrolyte but the electrolyte is continually replenished in polyhalide by dissolution of same of the undissolved polyhalide. Because the polyhalides display only limited solubility in dipolar aprotic solvents, the resulting lower concentrations of free halogens provide improved shelf life. Additionally, the quaternary ammonium polyhalide salt acts to form an insoluble protective film on the alkali metal anode which film prevents reaction of the alkali metal with the polyhalide or halogen, thereby minimizing self-discharge.

In one embodiment of the present invention, the quaternary ammonium polyhalide is dissolved in an aprotic solvent and an insoluble cathode, such as carbon, is employed. As an example, lithium tetramethylammonium tribromide in an amount of about 0.02 mole per liter is dissolved in propylene carbonate, and lithium and carbon electrodes are immersed therein. The foregoing combination provides an open circuit voltage of 3.57 volts. In an alternative embodiment, the cathode can comprise a non-corrosive screen, such as stainless steel, upon which particulate porous carbon is molded into the desired shape. The porous carbon is impregnated with the quaternary ammonium polyhalide. The resulting cathode structure thus includes a collector, a cathode-active material (i.e. the polyhalide) and a porous carbon support for the cathode-active material.

In order to give those skilled in the art a better understanding of the present invention, the following illustrative example is given.

EXAMPLE 1

A flat plate cell was prepared. The cathode consisted of a nickel grid, a carbon carrier and an oxidant. The nickel grid was one centimeter square and served as a current collector and as a support member. The cathode was prepared by dry pressing a mixture of 0.82 part of tetramethylammonium tribromide and 0.18 part of acetylene black on the nickel grid. The anode was prepared by pressing metallic lithium to another one centimeter square nickel grid. The electrolyte consisted of 0.6 mole of lithium hexafluorophosphate per liter of propylene carbonate. The anode and cathode were immersed in the electrolyte and were separated from each other by a polypropylene separator. The resulting cell had an open circuit potential of 3.57 volts.

Figure 2:
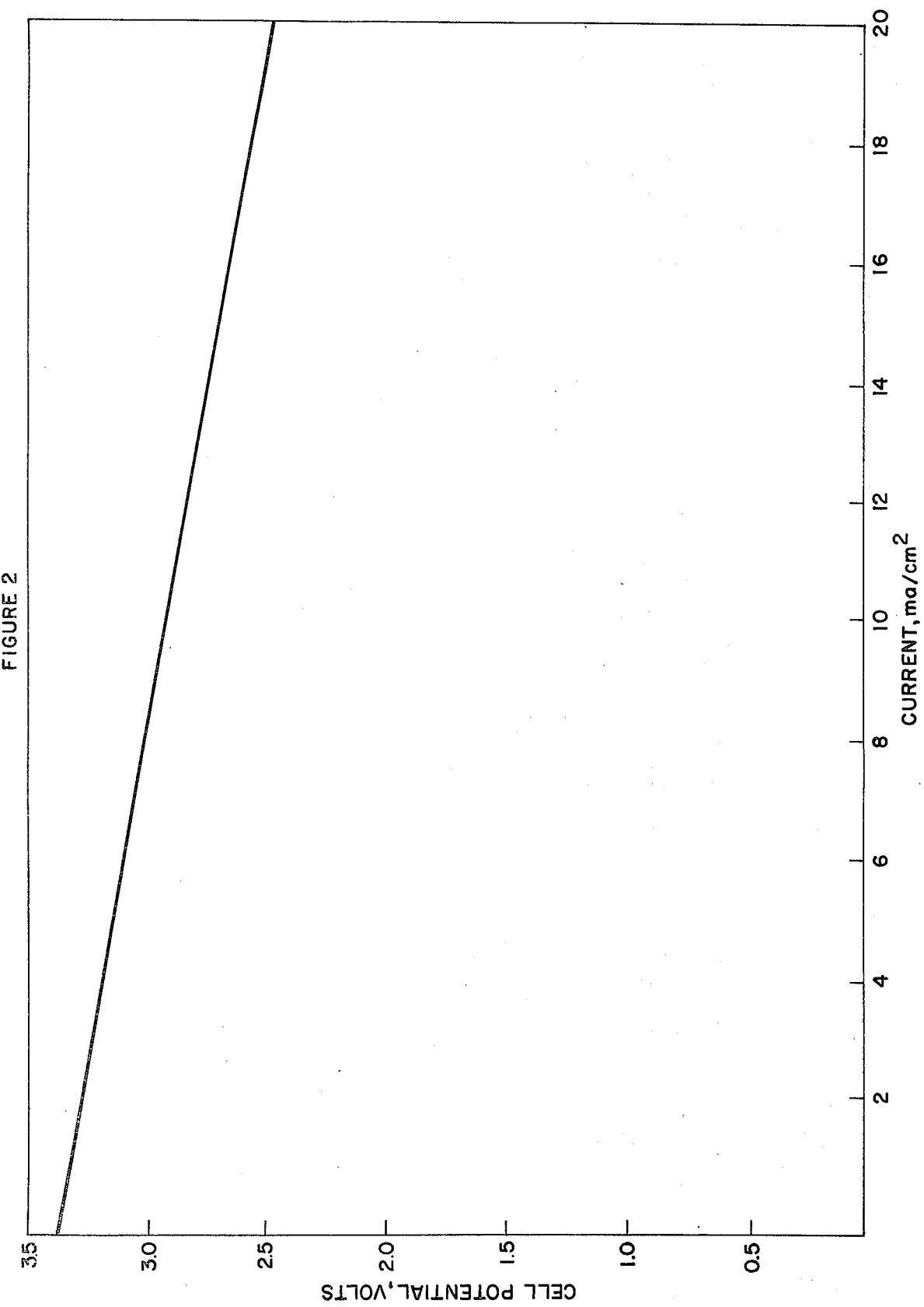
FIG. 2 is a graph of the potential versus current density of a cell in accordance with the present invention.

The cell was discharged at 23.5° C. The cell was discharged at 20 milliamps per square centimeter ($ma/cm^2$) and at 6.5 $ma/cm^2$. The discharge curves are shown in FIG. 1, which shows that at a discharge rate of 6.5 $ma/cm^2$ the cell of the present invention provides a comparatively flat discharge curve. FIG. 2 confirms that the potentials of the cells in accordance with the present invention are significantly insensitive to the rate of discharge.

What is claimed is:

1. An electrochemical cell comprising an anode containing at least one alkali metal as the anode-active material, a cathode, an oxidant of at least one quaternary ammonium polyhalide and an electrolyte of an aprotic solvent having an ionizable salt of at least one alkali metal dissolved therein.

2. The electrochemical cell described in claim 1 wherein the cathode comprises an electrochemically inactive electronic conductor.

3. The electrochemical cell described in claim 1 wherein the cathode includes porous carbon with the oxidant impregnated thereon.

4. The electrochemical cell as described in claim 1 wherein the anode contains lithium, the electrolyte is lithium hexafluorophosphate dissolved in propylene carbonate to which is added lithium tetramethylammonium tribromide and the cathode is electronically conductive carbon.

5. The electrochemical cell described in claim 1 wherein the halide in the polyhalide is at least one member of the group consisting of chlorine, bromine and iodine.

6. The electrochemical cell as described in claim 1 wherein the aprotic solvent is at least one member selected from the group consisting of propylene carbonate, nitrobenzene and sulfolane.

7. The electrochemical cell described in claim 1 wherein the anode is lithium.

8. The electrochemical cell described in claim 1 wherein the anode is an alloy of lithium.

9. The electrochemical cell described in claim 1 wherein the oxidant is at least one polyhalide selected from the group consisting of tetramethylammonium trichloride, tetramethylammonium tribromide, tetramethylammonium chlorodibromide, tetramethylammonium iododibromide, tetraethylammonium trichloride, tetraethylammonium tribromide, and tetraethylammonium chlorodibromide.

* * * * *